United States Patent [19]

Rome

[11] 4,129,471

[45] Dec. 12, 1978

[54] BOOKBINDING TECHNIQUE

[75] Inventor: Bernard Rome, New York, N.Y.

[73] Assignee: Rome Industries, Inc., New York, N.Y.

[21] Appl. No.: 683,461

[22] Filed: May 13, 1976

Related U.S. Application Data

[63] Continuation-in-part of Ser. No. 583,891, Jun. 5, 1975, abandoned.

[51] Int. Cl.[2] .......................... B32B 3/04; B31F 3/00; B42D 1/00

[52] U.S. Cl. .................................... 156/211; 156/216; 156/227; 281/21 R

[58] Field of Search ............... 156/211, 216, 227, 196; 281/21 R

[56] References Cited

U.S. PATENT DOCUMENTS

| | | | |
|---|---|---|---|
| 2,505,743 | 4/1950 | Rose | 156/216 |
| 3,531,358 | 9/1970 | Rost et al. | 281/21 R |
| 3,717,366 | 2/1973 | Decker | 281/21 R |
| 3,788,921 | 1/1974 | Polit et al. | 156/216 |
| 3,847,718 | 11/1974 | Watson | 428/55 |

*Primary Examiner*—William A. Powell
*Assistant Examiner*—William H. Thrower
*Attorney, Agent, or Firm*—Cooper, Dunham, Clark, Griffin & Moran

[57] ABSTRACT

A small-lot bookbinding technique wherein a stack of collated paper sheets is held within a one-piece cover folder and adhered to the backbone thereof. The folder is constituted by a flexible panel having a pair of score lines defining a backbone zone flanked by front and rear cover sections. Fully coating the backbone zone and overlapping the score lines is a band of hot-melt adhesive material, the margins of the band slightly invading the cover sections, whereby when the paper stack is inserted within the folder with the edge thereof engaging the band and heat is thereafter applied to the band for a predetermined period, the adhesive melts and then, upon cooling, sets to firmly bond all sheets to the backbone including the first and last sheets of the stack.

9 Claims, 6 Drawing Figures

BOOKBINDING TECHNIQUE

CROSS-REFERENCE TO RELATED APPLICATION

This application is a continuation-in-part of my co-pending application Ser. No. 583,891 filed June 5, 1975 now abandoned.

BACKGROUND OF INVENTION

This invention relates generally to small-lot bookbinding techniques, and in particular to a technique in which a stack of collated paper sheets to be bound is inserted within a folder and adhered to the backbone thereof.

Binding machines of the type used to mass-produce books are highly complex and expensive and therefore unsuitable for small-lot binding operations. In order, therefore, to make it possible to bind legal briefs, technical reports and other multiple-page documents in relatively small lots, various bookbinding schemes have been devised for use by office personnel rather than by professional binders. The term small-lot, as used herein, refers to a production run not usually in excess of 100 copies and often well below this number.

In one known small-lot bookbinding arrangement which is commercially available, the stack of collated sheets to be bound is sandwiched between cover sheets to form an assembly, and the sheets are then in sub-sets sequentially fed into a mechanical puncher adapted to punch edge holes therein. Thereafter a plastic spine is applied to the punched sheets, the spine being provided with complementary rows of curved teeth which enter the holes to bind the assembly. The operations involved in this binding technique require a fair degree of skill and are time-consuming, for the operator must exercise care in punching the holes and use a special device to apply the spine.

In another known technique for small-lot binding as disclosed in U.S. Pat. No. 3,321,786, use is made of a device adapted to clamp a stack of sheets so that the edge thereof may have liquid adhesive applied thereto by an operator. This process is slow and inefficient and is generally unsuitable for office personnel. In an attempt to improve this technique, U.S. Pat. No. 3,757,736 provides a machine which clamps the pages to be bound on a carriage that travels across a rotating drum serving to apply a hot melt glue to the exposed edge of the clamped pages. But this machine requires operating skills and the preparation of a heated liquid adhesive.

In order to simplify small-lot binding operations, U.S. Pat. No. 3,717,366 shows an arrangement in which a paper stack is inserted within a folder and is adhered thereto by means of a solid strip of hot-melt adhesive that must be interposed between the edge of the stack and the back of the folder, heat then being applied to melt the adhesive to bond the edge of the stack to the back of the folder.

One difficulty with this known arrangement is that the thickness of the stack varies from lot to lot, hence the adhesive strip must in each instance be tailored to conform to the changing thickness requirements. Moreover, since the width of the inserted strip can be no greater than the width of the back, in practice this adhesive may fail to bond the top and bottom sheets in the stack, which remain loose and unbound, the resultant book being unacceptable.

SUMMARY OF INVENTION

In view of the foregoing, it is the main object of the present invention to provide an improved small-lot binding technique which makes it possible for office personnel and other unskilled operators to quickly and effectively carry out bookbinding operations.

More specifically, it is an object of the invention to provide a technique in which the holt-melt adhesive for binding a stack of sheets is pre-coated on the backbone of a one-piece cover folder, whereby when the assembly of stack and folder is inserted within a heater unit adapted to receive assemblies of different thicknesses, heat is applied to the rear of the backbone for a predetermined period to activate the adhesive coating and to bond the edge of the stack to the backbone.

A significant feature of this invention resides in the fact that the backbone zone of the cover folder is defined by at least one and in many cases by a pair of parallel score lines, whereas the adhesive coating is constituted by a band which extends the full length of the backbone but is broader than the zone so that the band wraps around the the edge of the inserted paper stack to ensure adhesion to the first and last sheets as well as to the intermediate sheets of the stack.

An important advantage of the present invention is that despite the absence of clamping pressure against the stack to ensure a binding edge in which the sheets are tightly held together, all sheets in the stack are securely bonded to the backbone, thereby obviating the need for clamping devices.

Yet another object of this invention is to provide a low-cost, high-speed binding technique adapted to produce books of different size in small lots.

Briefly stated, these objects are attained by means of a cover folder formed by a flexible panel of cover material having at least one and in many cases a pair of parallel score lines defining a backbone zone flanked by front and rear cover sections, a band of hot-melt adhesive fully coating the backbone zone and overlapping the score lines, the margins of the band slightly invading the cover sections, whereby when a paper stack is inserted in the folder the adhesive band is wrapped about the edge thereof and when heat is thereafter applied to the band for a predetermined period, the adhesive melts and then, upon cooling, sets to firmly bond all sheets including the first and last sheets of the stack.

OUTLINE OF DRAWINGS

For a better understanding of the invention as well as other objects and further features thereof, reference is made to the following detailed description to be read in conjunction with the accompanying drawings, wherein.

DESCRIPTION OF THE INVENTION

Figure 1:
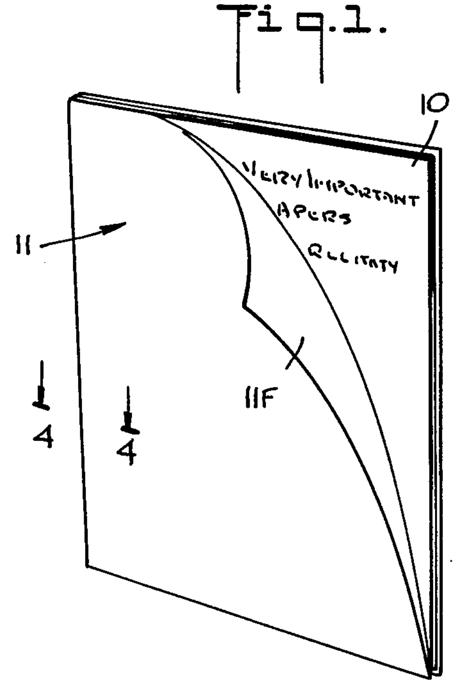
FIG. 1 is a perspective view of a soft cover book made in accordance with the invention.
Figure 2:
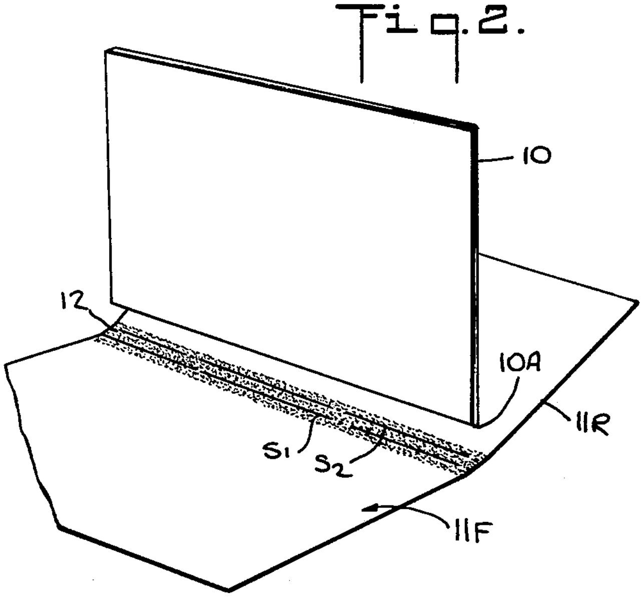
FIG. 2 shows the folder and paper stack components of the book assembly.

Referring now to FIGS. 1 and 2, there is shown a book assembly in accordance with the invention, the components of which are a stack 10 of paper sheets and a soft cover folder, generally designated by numeral 11. Stack 10 may be any set of collated pages to be bound, such as a legal brief or a commercial report, all of whose pages are of the same size (say letter size or legal size), the stack having a rear edge 10A formed by the cluster of paper edges.

Cover 11 is constituted by a rectangular panel of suitable soft cover material such as tag paper stock, the panel being scored to provide a pair of parallel score lines $S_1$ and $S_2$ defining a backbone zone Z in the space therebetween. Zone Z is flanked by a front cover section 11F and a rear cover section 11R which in the completed book lie respectively against the front and back pages of the stack.

Figure 3:
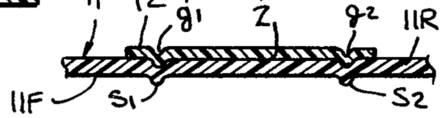
FIG. 3 is a transverse section taken through the cover folder in its flat state.

As best seen in FIG. 3, fully coating the backbone zone Z and overlapping score lines $S_1$ and $S_2$ is a band 12 of hot-melt adhesive material, the margins of the band slightly invading cover sections 11F and 11R. Thus the band which runs the full length of the backbone zone is somewhat broader than this zone. The band is formed of a solid, thermoplastic material which melts quickly upon heating and then sets to form a bond upon cooling. In general, a hot-melt adhesive is low in cost and is also low in strength, but its strength is more than adequate for bonding cellulosic materials such as paper. Typical ingredients of hot-melts are polyethylene, polyvinyl acetate, polyamides and hydrocarbon resins.

The dimensions of folder 11 are such as to accommodate a stack of paper of like size, the width of backbone zone Z being appropriate to the thickness of the stack. In practice, therefore, the user may be provided with a stock of folders in both legal and letter size in a range of backbone widths. As will be later explained, the width of the backbone is not critical.

Figure 4:
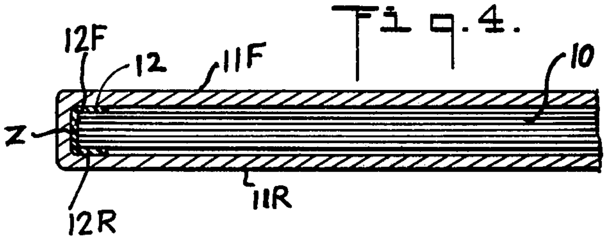
FIG. 4 is a section taken through the book in the plane indicated by line 4—4 in FIG. 1.

To form the assembly, stack 10 is inserted within the folder, with its rear edge 10A, as shown in FIG. 4, directly abutting the surface of hot-melt adhesive band 12. But since the band is somewhat broader than this edge, the opposing margins 12F and 12R of the band are folded against the top and bottom sheets of the stack.

Figure 6:
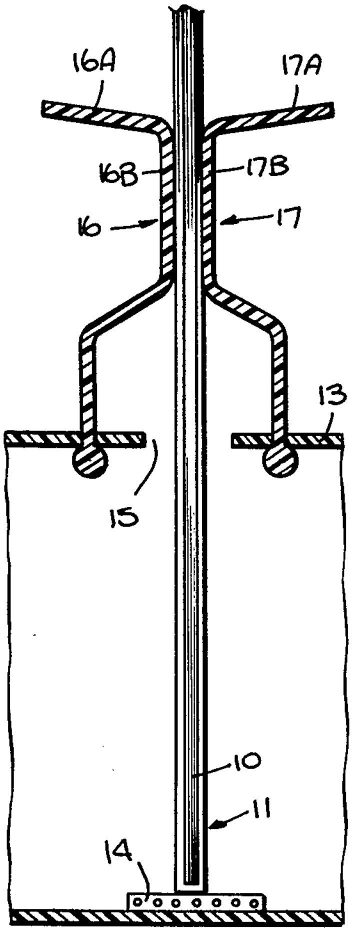
FIG. 6 is a section taken through the heating unit.
Figure 5:
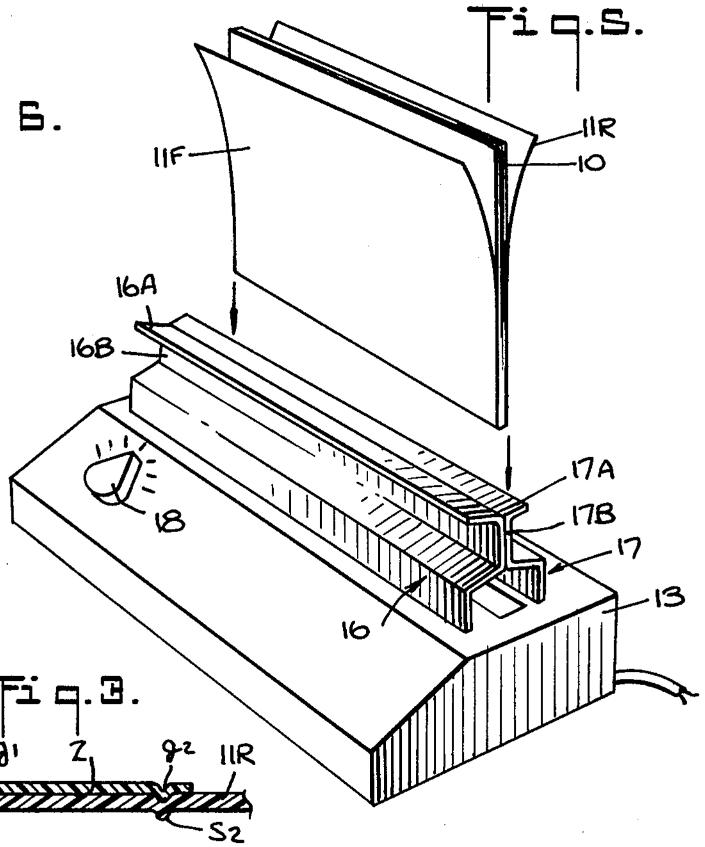
FIG. 5 is a perspective view of the heating unit for the book assembly.

The heater unit for the assembly as shown in FIGS. 5 and 6 includes a hollow casing 13 having an elongated electrical heater element 14 mounted therein on the floor of the casing at a position directly below and in registration with a longitudinal slot 15 formed in the top wall of the casing. Mounted adjacent the long sides of the slot are a pair of cooperating jaws 16 and 17 formed by panels of flexible plastic sheeting which are shaped to define inlet wings 16A and 17A below which are pads 16B and 17B which press against the cover sections of the folder 11 to hold the assembly inserted therebetween in an upright position whereby the exterior surface of the backbone rests on top of the heater element.

Heater element 14 is operated by means of a timer switch 18 which in practice may be adjustable to effect energization of the element for a predetermined period sufficient to permit heat to pass through the backbone and to melt the hot-melt band, at which point power is automatically turned off to permit the adhesive to set and effect a bond. This period depends on the nature of the adhesive and the thickness and width of the backbone; hence different periods are used for different lots.

The marginal portions 12F and 12R of the adhesive band which are folded against the first and last sheets of the stack, as shown in FIG. 4, lie in the vertical plane when the assembly is vertically positioned within the heater unit, as shown in FIG. 6. Consequently, when the adhesive which is wrapped around the edge of the stacks is heated to its melting point, melted adhesive from the margins of the band flows downwardly to ensure the presence of adhesive to effect a bond between the top and bottom sheets of the stack and the backbone.

An effective bonding action takes place even if a folder is used whose backbone is slightly broader than the edge of the stack so that the paper sheets at this edge are somewhat loose rather than snugly socketed by the folder. The reason for this action is that the margins of the band provide a reserve supply of adhesive to make certain that all sheets in the stack are exposed to adhesive and securely bound to the backbone. Hence, the relationship between the backbone and the stack edge is not critical nor is it essential that all sheets in the stack be precisely positioned with respect to the backbone.

This factor is of practical importance in that one cannot rely on the typical office operator to exercise great care in jogging the papers of the stack so that it presents a perfectly smooth edge for binding, nor can one expect this operator to carefully insert the stack in the folder. But with folders in accordance with the invention, there is a relatively broad tolerance range so that good binding can be accomplished even with a somewhat careless operator.

To expedite the completion of the binding operation, one may dispose a blower in the casing, and arrange the blower operating circuit so that it is activated as soon as the heater element is de-energized, thereby accelerating the cooling and setting of the adhesive.

In order to ensure an effective wrap-around relationship between the adhesive band and the edge of the stack, it is important that the angle of fold be a relatively sharp 90° and that buckling at the fold lines be avoided. Since the adhesive band tends to stiffen the score lines which it overlays, in practice, the one piece panel after being coated with the liquid adhesive is folded while the band is still in the semi-soft state, for if the band is permitted to harden, the fold line will be curved rather than sharp. Alternatively, before folding takes place, one may indent V-shaped grooves $g_1$ and $g_2$ in the top surface of the band 12, as shown in FIG. 3 in registration with score lines $S_1$ and $S_2$ to facilitate a sharp fold. In this instance, the indenting knives should be heated to prevent a build-up thereon of the adhesive. In the making of folders, it is desirable first to score the folder material, then fold the folder along the score line or lines to "break" the fibers of the material, then to flatten the folder and apply the hot-melt adhesive material thereto, and finally to re-fold the folder along the score line or lines before the adhesive material has set to complete a folder of the type shown in FIG. 2 to be used subsequently for binding a stack of sheets therein. While initial folding of a single-score line folder may not be necessary prior to the application of the adhesive, it is generally preferred.

While there has been shown and described a preferred embodiment of a bookbinding technique in accordance with the invention it will be appreciated that many changes and modifications may be made therein without however departing from the essential spirit thereof.

For example, as a protective measure to make sure that no heating occurs unless the edge of the stack in the folder lies against the band, an interlock may be provided in the form of a light or laser source arranged to project a beam in a path just above the backbone of the folder resting on the heater. If a space exists between the edge of the stack and the backbone because of improper insertion of the stack, then the beam will project through the space and be intercepted by a sensor to operate a relay breaking the power circuit to the heater to prevent heating of the defective assembly. But if the beam is blocked by a properly inserted stack, then heating will take place.

Also, while the invention has been described principally in connection with folders having a pair of parallel score lines to define a backbone zone therebetween, for binding small reports not exceeding about 15 pages, the backbone is preferably defined by a single score line having a band of adhesive coated thereon, the score line being centered with respect to the band, whereby the margins of the band extend somewhat into the front and rear covers. In a single score line folder, the folder is not sharply folded, but is so folded that the stiffening effect of the band causes the fold to assume a somewhat curved formation, creating a narrow trough to receive the edge of the papers to be bound, with the adhesive band being wrapped about this edge.

In practice, one may also provide folders whose front and rear covers are constituted by plastic sheets (such as vinyl acetate or polyethylene) which are joined together by a paper strip which is scored and adhesive coated to define the necessary bindable backbone or spine.

What is claimed is:

1. A method of making a binder to be used in the subsequent binding together of a stack of sheets comprising defining a backbone zone and flanking cover sections in a one-piece panel of folder material, applying a substantially uniform band of hot-melt adhesive in the liquid state to said backbone zone, the margins of said band overlying said backbone zone and extending slightly into said cover sections, and folding said panel while said adhesive band is still wet and non-resistant so that said backbone zone is substantially in one plane and said flanking cover zones are in planes substantially perpendicular thereto, and cooling said hot melt adhesive so that it sets in a general U-shape in cross-section as it extends throughout said backbone zone and slightly into said cover sections along the edges of said backbone zone, thereby to complete said binder to be used for the subsequent binding of a stack of sheets therewithin.

2. A method of making a binder to be used in the subsequent binding together of a stack of sheets comprising scoring one or more lines on a one-piece flat panel of folder material to define a backbone zone and flanking cover sections, applying a band of hot-melt adhesive in the liquid state to said backbone zone, the margins of said band overlying said score lines and extending slightly into the cover sections, permitting said band to set to form a band of hard adhesive, and scoring said hard band on one or more lines in registration with said folder score lines to facilitate sharp folds.

3. A method of making a binder to be used for the subsequent binding together of a stack of sheets comprising the steps of scoring a substantially flat cover material along at least one score line to create a backbone zone flanked by first and second cover sections on both sides thereof, and applying a substantially uniform band of hot melt adhesive material to said cover material which is set and which extends substantially throughout said backbone zone and partially into said cover sections along the edges of said backbone zone, thereby to complete a binder to be used for the subsequent binding of a stack of sheets therewithin.

4. A method according to claim 3, in which said hot-melt adhesive material is applied in the fluid state, and including the further step of bending said cover material along said at least one score line before said hot-melt adhesive material sets to form a binder in which said band of adhesive material is generally U-shaped in cross-section.

5. A method according to claim 3, in which said cover material is scored along only one line.

6. A method according to claim 3, in which said cover material is scored along a pair of parallel lines.

7. A method according to claim 6, in which said adhesive material is scored along lines registered with said score lines in said cover material.

8. A method according to claim 3, including the further step of bending said cover material along said at least one score line and then causing said cover material to resume its substantially flat state prior to the application of said hot melt adhesive material thereto.

9. A method according to claim 8, in which said hot-melt adhesive material is applied in the fluid state, and including the further step of bending said cover material along said at least one score line before said hot-melt adhesive material sets to form a binder in which said band of adhesive material is generally U-shaped in cross-section.

* * * * *